United States Patent
Daetz et al.

(10) Patent No.: US 6,880,328 B2
(45) Date of Patent: Apr. 19, 2005

(54) EXHAUST SYSTEM OF A MULTI-CYLINDER INTERNAL COMBUSTION ENGINE AND A METHOD OF CLEANING AN EXHAUST GAS

(75) Inventors: Michael Daetz, Tiddische (DE); Achim Donnerstag, Braunschweig (DE); Frank-Michael Wittig, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/177,794

(22) Filed: Jun. 20, 2002

(65) Prior Publication Data

US 2003/0014967 A1 Jan. 23, 2003

(30) Foreign Application Priority Data

Jun. 21, 2001 (DE) .......................................... 101 30 054

(51) Int. Cl.[7] .................................................. F01N 3/00
(52) U.S. Cl. .......................... 60/285; 60/276; 60/289; 60/302
(58) Field of Search .......................... 60/274, 276, 284, 60/285, 289, 300, 302

(56) References Cited

U.S. PATENT DOCUMENTS

| | | | | |
|---|---|---|---|---|
| 5,388,402 A | * | 2/1995 | Aoki et al. ................... | 60/285 |
| 5,388,403 A | * | 2/1995 | Nagami et al. ................ | 60/289 |
| 5,577,383 A | * | 11/1996 | Kuroda et al. ................ | 60/284 |
| 5,755,094 A | * | 5/1998 | Maki et al. ................... | 60/276 |
| 5,867,982 A | * | 2/1999 | Tengblad et al. ............. | 60/289 |
| 6,044,644 A | * | 4/2000 | Hu et al. ...................... | 60/302 |
| 6,244,044 B1 | * | 6/2001 | Bartley ........................ | 60/284 |

* cited by examiner

*Primary Examiner*—Tu M. Nguyen
(74) *Attorney, Agent, or Firm*—Kenyon & Kenyon

(57) ABSTRACT

An exhaust system of a multi-cylinder internal combustion engine includes at least one first gas sensor, which is sensitive for at least one component of the exhaust gas and is arranged in the exhaust system, for determining an air/fuel ratio supplied to the internal combustion engine. It also includes a regulating device for regulating the air/fuel ratio as a function of a signal supplied by the gas sensor and at least one first catalytic converter arranged in the exhaust system. At least one first catalytic converter is arranged in a position of the exhaust system close to the internal combustion engine so that it is upstream from the at least one first gas sensor in the direction of flow of an exhaust gas of the internal combustion engine, and the regulation device includes a regulator which receives the signal of the first gas sensor as input, and in which an algorithm for cylinder-selective determination and regulation of the air/fuel ratio is stored.

15 Claims, 1 Drawing Sheet

EXHAUST SYSTEM OF A MULTI-CYLINDER INTERNAL COMBUSTION ENGINE AND A METHOD OF CLEANING AN EXHAUST GAS

FIELD OF THE INVENTION

The present invention relates to an exhaust system of a multi-cylinder internal combustion engine and a method of cleaning an exhaust gas.

BACKGROUND INFORMATION

It is conventional that gas sensors which are sensitive for one component of exhaust gas should be arranged in a position as close to the internal combustion engine as possible in the exhaust ducts of internal combustion engines to determine and regulate (lambda regulation) an air/fuel ratio of the internal combustion engine as a function of a signal supplied by the gas sensor. Such sensors are usually lambda probes which measure the oxygen concentration of the exhaust gas.

It is also conventional that catalytic converters which convert one or more pollutant components of the exhaust gas into less environmentally critical compounds may be integrated into the exhaust duct downstream from the gas sensor. Three-way catalytic converters promote oxidation of unburned hydrocarbons (HC) and carbon monoxide (CO) to carbon dioxide ($CO_2$) and water ($H_2O$), while at the same time supporting the reduction of nitrogen oxides ($NO_x$) to nitrogen ($N_2$). Almost complete conversion of pollutants is achievable only at a stoichiometric exhaust gas atmosphere of $\lambda=1$. A growing environmental awareness in combination with increasingly more stringent statutory emission limits necessitates extremely accurate lambda regulation and emission monitoring.

One problem with conventional exhaust systems is due to a catalyst-specific temperature threshold below which the catalytic converter has inadequate conversion activity or none at all. This minimum conversion temperature for light-off is typically approximately 350° C. This temperature is not reached in certain internal combustion engine operation situations, in particular for a certain period of time after a cold start, so that during these phases, the exhaust gas is emitted with virtually no cleaning. There are conventional internal combustion engine measures, e.g., late ignition, to make it possible to nevertheless achieve catalytic converter heating in such situations, and there are also non-internal combustion engine measures such as catalytic converter heating devices. However, these measures are always associated with increased fuel consumption and in some cases with a much greater complexity in terms of equipment.

Therefore, it is an object of the present invention to provide an exhaust system and an exhaust emission control method which may guarantee rapid catalytic converter heating with a simple and inexpensive arrangement and make it possible to achieve low pollution emission levels.

SUMMARY

The above and other beneficial objects of the present invention are achieved by providing an exhaust system and a method as described herein.

One example embodiment of the exhaust system according to the present invention provides that at least one first catalytic converter is arranged in a position of the exhaust system close to the internal combustion engine so that it is upstream from the at least one first gas sensor in the direction of flow of an exhaust gas of the internal combustion engine, and the regulation device includes a regulator which receives the signal of the first gas sensor as input, and in which an algorithm for cylinder-selective determination and regulation of the air/fuel ratio is stored.

Due to the very short distance traveled by an exhaust gas coming from the cylinders of the internal combustion engine to the first catalytic converter, heat loss of the exhaust gas on its flow path to the catalytic converter is minimized and very rapid heating of the catalytic converter is achieved, in particular after a cold start of the internal combustion engine. Due to the cylinder-selective lambda regulation, a targeted inequality of individual air/fuel ratios of the various cylinders is implemented by operating individual cylinders with a lean mixture ($\lambda>1$) even during the cold start phase in order to accelerate heating of the catalytic converter. On the other hand, cylinder-selective lambda regulation when the internal combustion engine is warm permits a very accurate regulation stabilization of all cylinders at an optimum lambda value with regard to pollutant conversion rate. On the whole, the exhaust system according to the present invention makes it possible to reduce the emission of pollutants.

In an example embodiment of the present invention, at least one first catalytic converter is arranged in a manifold or a preliminary pipe of the exhaust system into which the cylinders of the internal combustion engine open. The catalytic converter may include a number of first catalytic converters having a small volume, one being arranged in each manifold pipe of the manifold. The volumes of the catalytic converters are to be dimensioned according to the number of catalytic converters. For example, if four catalytic converters are arranged in the four manifold pipes of a symmetrical manifold of a four-cylinder internal combustion engine, their volumes may amount to approximately one quarter of a volume of a conventional individual pre-catalytic converter. In the case of multi-pass exhaust systems, in particular two-pass exhaust systems, use of which is conventional for V-style internal combustion engines in particular, two medium catalytic converters may be arranged in the manifolds or preliminary pipes of the two exhaust ducts. This arrangement of the catalytic converters in the manifold extremely close to the internal combustion engine, i.e., directly downstream from outlet valves of the cylinders of the internal combustion engine, results in extremely short catalytic converter warm-up phases, further supported by the relatively small volume of the catalytic converters.

The first gas sensor may be arranged so that it permits individual determination of the air/fuel ratios of the individual cylinders. The gas sensor is arranged so that it is exposed to the oncoming flow of exhaust gas from the individual cylinders in chronological succession. Therefore, a time characteristic of the sensor signal includes information about the air/fuel ratios of the individual cylinders. For example, the first gas sensor may be arranged at a nodal point in the manifold where the manifold pipes converge and open into a common exhaust duct.

In an example embodiment of the present invention, the first gas sensor includes a lambda probe, in particular a broadband lambda probe. Broadband lambda probes supply a steady, approximately linear signal as a function of the concentration of oxygen in the exhaust gas. They are suitable for detecting both lean and rich lambda values.

The regulating device may also include a cylinder-selective injection system with which the air/fuel ratio to be supplied to the cylinders is adjustable individually. To this end, the injection time may be influenced in a cylinder-selective manner.

The properties of catalytic converters are largely determined by the type of catalytic coating. A plurality of such coatings is conventional and available commercially. Arranging the first catalytic converter very close to the internal combustion engine according to the present invention results in a very high thermal load on the catalytic converter and therefore requires a high thermal stability. Furthermore, since the lambda value is only determined downstream from the first catalytic converter, a low oxygen storage capacity of the coating is also possible, so that the lambda value detected is not invalidated by any release of previously stored oxygen. In addition, a catalytic coating having the lowest possible conversion temperature (light-off) may be provided. This further promotes the early light-off of the catalytic converter produced by the arrangement of the catalytic converter according to the present invention after a cold start of the internal combustion engine. Finally, the first catalytic converter may also have a high conversion rate for unburned hydrocarbons HC even in a lean exhaust gas atmosphere.

The foregoing object is also achieved by providing a method according to which the first step in pollutant conversion is performed in a position close to the internal combustion engine, and the concentration of the at least one exhaust gas component is detected downstream from the first step of conversion of pollutants in the direction of flow of the exhaust gas, and the air-fuel mixture supplied to the internal combustion engine is detected and regulated in a cylinder-selective manner.

Other example embodiments of the present invention are derived from the other features described herein.

DETAILED DESCRIPTION

Figure 1:
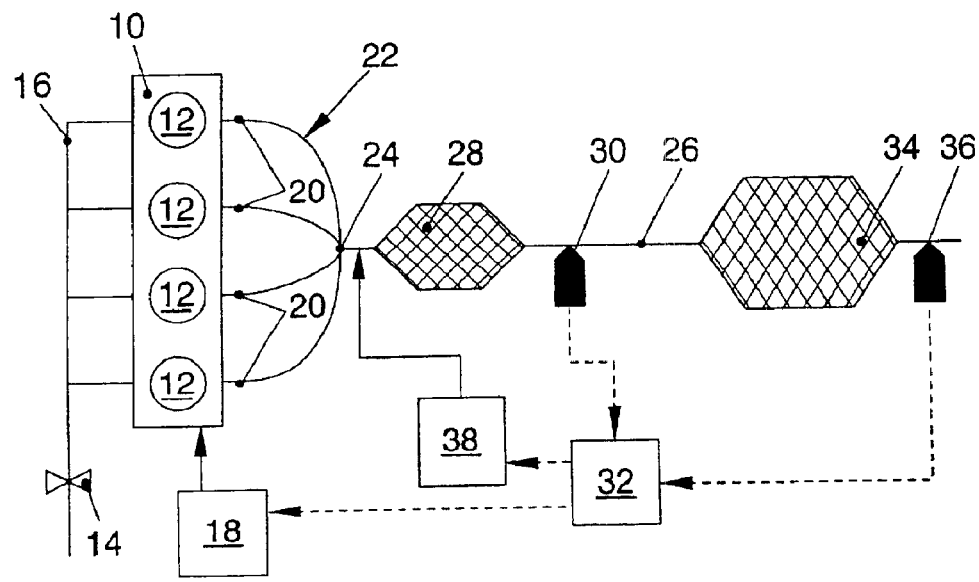
FIG. 1 is a schematic view of a first example embodiment of an exhaust system according to the present invention.

Internal combustion engine 10 illustrated in FIG. 1 is a four-cylinder in-line internal combustion engine having four cylinders 12. An air-fuel mixture to be supplied to cylinders 12 is processed firstly by a suction system 16 regulatable by a control arrangement 14 and secondly by a cylinder-selective fuel injection system 18. Cylinders 12 each open into manifold pipes 20 of a manifold 22 which combines an exhaust gas coming from cylinders 12 at a nodal point 24 in a common exhaust duct 26. A first catalytic converter 28 is arranged immediately downstream from a nodal point 24 of manifold 22. The position of first catalytic converter 28 close to the internal combustion engine causes it to heat up rapidly after a cold start of internal combustion engine 10 and reach its minimum conversion temperature promptly. First catalytic converter 28 is arranged in particular upstream from a first lambda probe 30, which may be configured as a broadband lambda probe. Lambda probe 30 detects a signal, which depends on the oxygen concentration of the exhaust gas, and relays this to a regulator 32. Due to a successive ignition of individual cylinders 12 according to a predetermined ignition sequence, the time characteristic of the signal includes information about the individual cylinders with regard to the exhaust gases of individual cylinders 12. Regulator 32 includes an algorithm which allows calculation of the individual cylinder lambda values from the signal curve of lambda probe 30. To this end, it may also be supplied with the information of the angle of rotation of a crankshaft. Regulator 32 is also capable of determining a total lambda value from the time characteristic of the sensor signal. Regulator 32 compares the individual cylinder lambda values with a lambda setpoint. To regulate this lambda setpoint in cylinders 12 of internal combustion engine 10, regulator 32 determines the required cylinder-selective injection parameters, such as the ignition angle and/or injection time, and presets them for injection system 18. Downstream from lambda probe 30, additional catalytic converters may be installed in exhaust duct 26. A second catalytic converter 34 having a conventional three-way coating is provided in the present example embodiment. The lowest possible minimum conversion temperature is also possible for the catalytic coating of second catalytic converter 34. Catalytic converter 34 may also be provided with a storage function for unburned hydrocarbons (HC). This permits the storage of HC until catalytic converter 34 has reached its minimum temperature. A second gas sensor 36 is downstream from second catalytic converter 34. Second gas sensor 36 may also be a lambda probe, in particular a simple step-response lambda probe. However, the use of pollution sensors, e.g., $NO_x$ or HC sensors, is also possible. Some of these sensors also have a lambda measurement function. Gas sensor 36 is used for the regulation and diagnostic purposes of catalytic converter 34. Its signal is input into regulator 32. The exhaust system illustrated also has a secondary air system 38 which feeds additional air into exhaust duct 26 upstream from first catalytic converter 28. In the simplest case, secondary air system 38 may be configured as an unregulated air delivery system or, as in the example embodiment illustrated, it may be configured as a regulated air delivery system which regulates the secondary air stream as a function of the measured lambda value.

Figure 2:
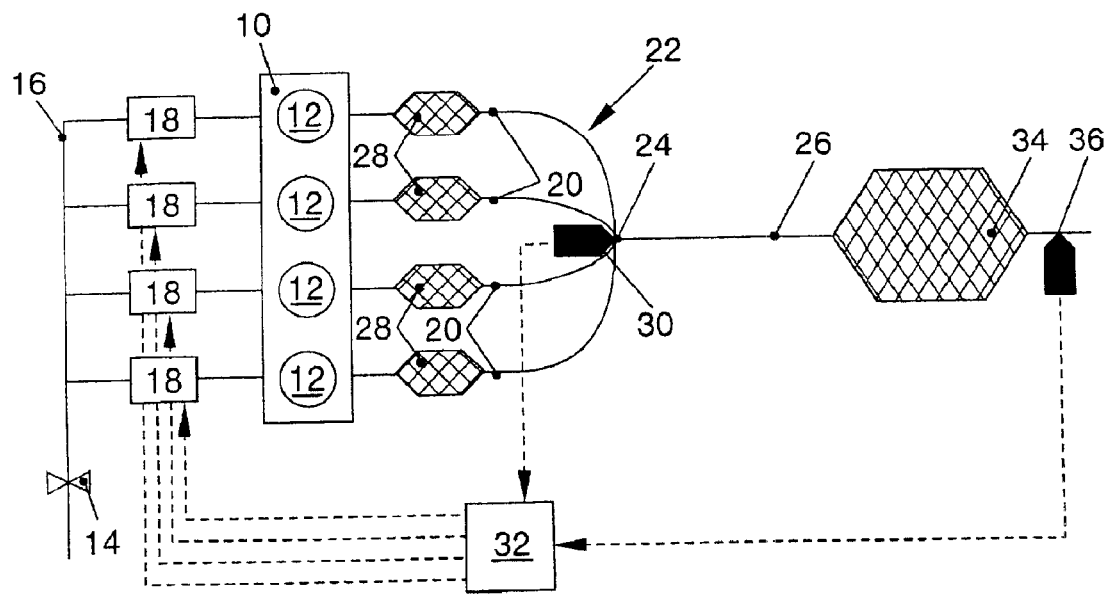
FIG. 2 is a schematic view of a second example embodiment of the exhaust system.

FIG. 2 illustrates a different arrangement of an exhaust system according to the present invention. The same components as in FIG. 1 are provided with the same reference numbers and are not explained in detail. In this example embodiment, the first catalytic converter includes four individual catalytic converters 28, each being arranged in manifold pipes 20 of manifold 22. In comparison with the single catalytic converter arrangement illustrated in FIG. 1, four catalytic converters 28 are configured with relatively small dimensions. Depending on the design of internal combustion engine 10, its volume may be 0.03 to 0.06 liter. Catalytic converters 28 are arranged as close to the internal combustion engine as allowed by their thermal stability. In this example embodiment, lambda probe 30 assumes a central position at nodal point 24 of manifold 22. Depending on the ignition sequence of cylinders 12, lambda probe 30 is exposed to the exhaust gases of individual cylinders 12 in alternation and in chronological sequence. The time characteristic of the probe signal thus supplies information on the individual cylinders. The cylinder-selective lambda measurement is facilitated by the most symmetrical possible configuration of manifold 22. The gas running lengths of individual manifold pipes 20 may be the same. Regulator 32 controls injection systems 18 for the individual cylinders as a function of the lambda values determined by regulator 32 for the individual cylinders. The exhaust system illustrated in FIG. 2 may also be provided with a secondary air system, which feeds air into manifold pipes 20 of manifold 22 upstream from catalytic converters 28.

The method according to the present invention is explained below on the basis of the system illustrated in FIG. 2.

After a cold start of internal combustion engine 10, i.e., after a prolonged shutdown, catalytic converters 28 very rapidly reach their coating-specific minimum conversion temperature because they are arranged very close to the internal combustion engine. The rapid operating readiness of catalytic converters 28 leads to rapid conversion of pollutants and thus to low total pollutant emissions. Rapid catalytic converter heating after a cold start may be combined with conventional measures and may be promoted further. For example, a combustion temperature and thus the exhaust gas temperature may be reached through targeted late ignition of internal combustion engine 10. Furthermore, internal combustion engine 10 may be operated with a slightly lean air-fuel mixture ($\lambda>1$) during the start-up or warm-up phase. In this case, the oxygen contained in the lean exhaust gas atmosphere promotes secondary combustion of unburned hydrocarbons (HC) at catalytic converters 28, which are heated by the exothermic combustion reactions. For the case when the internal combustion engine is incapable of running with a lean mixture immediately after starting the internal combustion engine, the same effect may also be achieved through an additional air feed through secondary air system 38 (cf. FIG. 1). If exhaust gases from two or more cylinders 12 of internal combustion engine 10 pass through a catalytic converter 28, as illustrated in FIG. 1, these cylinders 12 may also be regulated with different lambda coordination during the warm-up phase in a controlled manner. In particular, at least one of cylinders 12 opening into catalytic converter 28 may be operated with a lean air-fuel mixture. This procedure presupposes the cylinder-selective lambda measurement and regulation described above.

In a warm internal combustion engine 10, when catalytic converters 28 have exceeded their light-off temperature, all catalytic converters 28 may be exposed to exactly the same exhaust gas atmosphere at which optimum conversion of pollutants is achieved. In traditional exhaust systems without cylinder-selective lambda regulation, there are unavoidable differences in the mixtures in individual cylinders 12. These are caused, for example, by different air flow rates in suction system 16 or scattering in flow values of the injectors inherent in the configuration. Lambda regulation for the individual cylinders makes it possible to eliminate such different ratios. In this manner, it is possible to produce exactly stoichiometric ratios ($\lambda=1$) in all cylinders 12. The accuracy of the lambda regulation may be important because even the slightest inaccuracies may lead to serious losses in the conversion efficiency of catalytic converters. For example, a deviation of 0.1 from $\lambda=1$ produces a reduction of approximately 50% in the degree of pollutant conversion.

List of reference numbers 10 internal combustion engine
12 cylinder
14 control arrangement
16 air suction system
18 injection system
20 manifold pipe
22 manifold
24 nodal point
26 exhaust duct
28 first catalytic converter
30 first gas sensor/lambda probe -continued List of reference numbers 32 regulator
34 second catalytic converter
36 second gas sensor/lambda probe
38 secondary air system

What is claimed is:

1. An exhaust system of a multi-cylinder internal combustion engine, comprising:
at least one first gas sensor arranged in the exhaust system sensitive to at least one component of exhaust gas, the first gas sensor configured to determine an air/fuel ratio supplied to the internal combustion engine;
a regulation device configured to regulate the air/fuel ratio as a function of a signal supplied by the gas sensor, the regulation device including a regulator configured to receive the signal from the first gas sensor and configured to store an algorithm for cylinder-selective determination and regulation of the air/fuel ratio; and
at least one first catalytic converter arranged in the exhaust system in a position of the exhaust system close to the internal combustion engine upstream from the first gas sensor in a direction of flow of the exhaust gas of the internal combustion engine;
wherein the first catalytic converter is arranged in one of a manifold and a preliminary pipe of the exhaust system into which the cylinders of the internal combustion engine open, and
where the at least one first catalytic converter includes a plurality of first catalytic converters having a small volume, a first small-volume first catalytic converter arranged in each manifold pipe of the manifold.

2. The exhaust system according to claim 1, wherein the first gas sensor is arranged so that it is exposed to an oncoming flow of exhaust gas from the cylinders of the internal combustion engine in chronological succession.

3. The exhaust system according to claim 1, wherein the regulation device includes a cylinder-selective injection system configured to adjust the air/fuel ratio to be supplied to the cylinders in a cylinder-selective manner.

4. The exhaust system according to claim 1, wherein the first catalytic converter includes a catalytic coating having a low minimum conversion temperature, a high thermal stability and a low oxygen storage capacity.

5. The exhaust system according to claim 1, wherein the small volume includes a volume between 0.03 and 0.08 liters.

6. The exhaust system according to claim 1, wherein a volume of the at least one first catalytic converter is dimensioned according to a quantity of the at least one first catalytic converter.

7. The exhaust system according to claim 1, wherein the first gas sensor includes a lambda probe.

8. The exhaust system according to claim 7, wherein the lambda probe includes a broadband lambda probe.

9. The exhaust system according to claim 1, wherein the first catalytic converter has a high conversion rate for unburned hydrocarbons in a lean exhaust gas atmosphere.

10. The exhaust system according to claim 9, further comprising a secondary air system configured to supply additional air to the first catalytic converter arranged upstream of the first catalytic converter.

11. The exhaust system according to claim 10, wherein the secondary air system includes a device configured to detect a secondary air flow and to regulate the secondary air system as a function of a signal of the device and the first gas sensor.

12. The exhaust system according to claim 1, further comprising a second catalytic converter arranged downstream from the first gas sensor.

13. The exhaust system according to claim 12, wherein the second catalytic converter includes a three-way catalytic converter.

14. The exhaust system according to claim 12, wherein the second catalytic converter is configured to store unburned hydrocarbons.

15. An exhaust system of a multi-cylinder internal combustion engine, comprising:

at least one first gas sensor arranged in the exhaust system sensitive to at least one component of exhaust gas, the first gas sensor configured to determine an air/fuel ratio supplied to the internal combustion engine;

a regulation device configured to regulate the air/fuel ratio as a function of a signal supplied by the gas sensor, the regulation device including a regulator configured to receive the signal from the first gas sensor and configured to store an algorithm for cylinder-selective determination and regulation of the air/fuel ratio; and at least one first catalytic converter arranged in the exhaust system in a position of the exhaust system close to the internal combustion engine upstream from the first gas sensor in a direction of flow of the exhaust gas of the internal combustion engine;

wherein the first catalytic converter is arranged in one of a manifold and a preliminary pipe of the exhaust system into which the cylinders of the internal combustion engine open;

wherein the first gas sensor is arranged so that it is exposed to an oncoming flow of exhaust gas from the cylinders of the internal combustion engine in chronological succession; and wherein the first gas sensor is arranged at a nodal point in the manifold where manifold pipes converge.

* * * * *